2,838,533

11β-HYDROXY-17α-METHYLTESTOSTERONE

Jack W. Ralls, Berkeley, Calif., assignor to G. D. Searle & Co., Chicago, Ill., a corporation of Delaware No Drawing. Application March 27, 1956
Serial No. 574,095

1 Claim. (Cl. 260—397.45)

The present invention relates to a new derivative of methyltestosterone and more particularly to 11β-hydroxy-17α-methyltestosterone of the formula

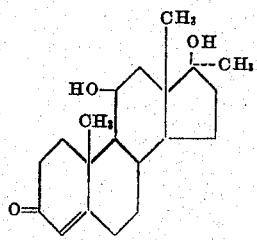

The preparation of this compound has been described in my copending application Serial No. 357,337 filed May 25, 1953, now U. S. Patent No. 2,740,798, of which the present application is a continuation-in-part. The compound of this invention is an active reticuloendothelial stimulant and an anabolic agent. The preparation of the claimed compound is conveniently carried out by dissolving methyltestosterone in blood, taking precautions against blood clotting and infection of the glands, and perfusing this blood solution repeatedly through surviving mammalian adrenal glands.

The following example illustrates in detail one of the methods useful in practicing the invention. However, it is not to be construed as limited thereby in spirit or in scope. In the example quantities of materials are indicated in parts by weight.

A solution of one part of 17α-methyltestosterone in 42 parts of propylene glycol is added to a mixture of 5000 parts of citrated beef blood and 5000 parts of a Tyrode solution containing 5000 parts of glucose. This mixture is passed through fifteen surviving bovine adrenal glands for six cycles at 36.4–37° C. while the pH is maintained at 6.61–6.90. The perfusate is hemolyzed by freezing and thawing and then extracted with isopropyl acetate. The extract is washed with water, dried by azeotropic distillation and then concentrated at reduced pressure in a nitrogen atmosphere to a residue of 20 parts. 380 parts of benzene are added and the resulting solution is poured into a chromatography column containing 95 parts of silica gel. The column is first eluted with two 500-part portions of a 9:1 mixture of benzene and ethyl acetate and then with two 500-part portions of a 4:1 and two 500-part portions of a 2:1 mixture of benzene and ethyl acetate. Concentration of the last four eluates yields unconverted starting material. After further elution with two 500-part portions of 1:1 mixtures the column is eluted with two additional 500-part portions of a 1:1 mixture and one 500-part portion of 1:2 mixture of benzene and ethyl acetate. Concentration of the eluates yields a yellowish, partly solid residue which, on crystallization from ethyl acetate, yields 11β-hydroxy-17α-methyltestosterone melting at about 209.5–211.5° C. A methanolic solution shows an ultraviolet maximum at about 242 millimicrons with a molecular extinction coefficient of 15,100. The infrared spectrum shows a maximum at 2.95 microns indicating the presence of the hydroxy group and at 6.05 microns indicating the presence of the conjugated carbonyl group. Under mild acetylation conditions, using acetic anhydride and pyridine at room temperature, the compound does not form an acetate. The test for an α-ketol with blue tetrazolium is negative.

What is claimed is:

11β-hydroxy-17α-methyltestosterone of the formula

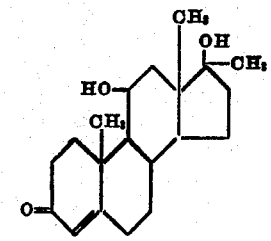

No references cited.